(12) United States Patent
Fukuchi et al.

(10) Patent No.: US 8,553,190 B2
(45) Date of Patent: Oct. 8, 2013

(54) LIQUID CRYSTAL DISPLAY DEVICE

(75) Inventors: Takakazu Fukuchi, Chiba (JP);
Takayoshi Hanami, Chiba (JP)

(73) Assignee: Seiko Instruments Inc. (JP)

( * ) Notice: Subject to any disclaimer, the term of this patent is extended or adjusted under 35 U.S.C. 154(b) by 209 days.

(21) Appl. No.: 13/066,863

(22) Filed: Apr. 27, 2011

(65) Prior Publication Data

US 2011/0267568 A1 Nov. 3, 2011

(30) Foreign Application Priority Data

Apr. 30, 2010 (JP) ................................ 2010-105969
Mar. 30, 2011 (JP) ................................ 2011-075595

(51) Int. Cl.
*G02F 1/1333* (2006.01)

(52) U.S. Cl.
USPC ........................................................ 349/138

(58) Field of Classification Search
None
See application file for complete search history.

(56) References Cited

U.S. PATENT DOCUMENTS

| 7,876,386 | B2 * | 1/2011 | Kubo et al. | 349/37 |
| 2003/0043326 | A1 * | 3/2003 | Sawasaki et al. | 349/123 |
| 2005/0046772 | A1 * | 3/2005 | Kubo et al. | 349/139 |

* cited by examiner

*Primary Examiner* — Sung Pak
(74) *Attorney, Agent, or Firm* — Adams & Wilks

(57) ABSTRACT

A liquid crystal display device has a wiring electrode and an independent gap electrode without wiring formed on a substrate, and an insulating film formed on the wiring and gap electrodes. A first display electrode, an outer second display electrode, and an inner second display electrode are formed on the insulating film and are electrically connected to the wiring electrode or the gap electrode via respective contact regions provided in the insulating film. The first display electrode overlaps with an edge portion of the gap electrode through intermediation of the insulating film. The outer second display electrode and the inner second display electrode each overlap with another edge portion of the gap electrode through intermediation of the insulating film. By such a construction, the wiring electrode is prevented from being visible or from having portions thereof being half-lit.

4 Claims, 9 Drawing Sheets

LIQUID CRYSTAL DISPLAY DEVICE

BACKGROUND OF THE INVENTION

1. Field of the Invention

The present invention relates to a liquid crystal display device for displaying marks such as characters and symbols with the use of liquid crystal.

2. Description of the Related Art

In order to realize bright display, there is employed a display system which does not use a polarizing plate, specifically, a display device which uses polymer dispersed liquid crystal or guest-host liquid crystal in which a dye (guest) and liquid crystal (host) are mixed. The polymer dispersed liquid crystal includes microencapsulated liquid crystal in which liquid crystal is confined in a polymer resin in advance, polymer network liquid crystal, and the like. A polymer network liquid crystal panel (hereinafter, referred to as PN liquid crystal panel) which uses the polymer network liquid crystal (hereinafter, referred to as PN liquid crystal) can perform low voltage driving. The PN liquid crystal is a composite liquid crystal material in which a polymer resin which polymerizes under ultraviolet light and general TN liquid crystal are mixed. When this liquid crystal material is irradiated with ultraviolet light, the polymer forms a network, and at the same time, the TN liquid crystal is uniformly dispersed in the polymer network. As a result, functions of both of the polymer and the TN liquid crystal may be simultaneously achieved.

The PN liquid crystal panel is a light-scattering liquid crystal display element, which scatters incident light with the use of a difference in refractive index between the polymer network and the TN liquid crystal. Therefore, a polarizing plate and an alignment film are unnecessary, which have been used in a conventional TN liquid crystal device. Therefore, light loss is extremely small, and bright display is possible.

However, the PN liquid crystal has bad steepness, which makes it difficult to perform multi-division driving, and hence static driving is mainly employed. Therefore, when a complex shape is to be displayed, there arises a problem that the number of wirings increases, and hence the display of those wirings becomes adversely visible. In order to solve the problem, transparent conductive films are laminated, and the wiring is formed of a transparent conductive film in the lower layer, to thereby make the display of the wiring invisible.

FIG. 12 is a cross-sectional view of a PN liquid crystal panel in which PN liquid crystal is injected between two transparent substrates. On a surface of a first substrate 61 on the lower side, a first transparent electrode 63 and an insulating layer 64 are formed. On the insulating layer 64, a second transparent electrode 58 and a peripheral electrode 60 are separately formed. The first transparent electrode 63 and the second transparent electrode 58 are connected to each other via a contact hole 57 opened in the insulating layer 64. On an entire surface of a second substrate 62, a third transparent electrode 59 is formed. The first substrate 61 and the second substrate 62 are adhered to each other by a sealing material 51, and PN liquid crystal 79 is injected between both the substrates (for example, see JP 2001-125086 A).

The PN liquid crystal is in a light scattering state when no electric field is applied, and is in a transmitting state when an electric field is applied. When a voltage is applied between the first transparent electrode 63 and the third transparent electrode 59, an electric field is applied to the PN liquid crystal 79 between the second transparent electrode 58 and the third transparent electrode 59, and thus the PN liquid crystal 79 transmits light. When the peripheral electrode 60 formed in the periphery of the second transparent electrode 58 is set to the same potential as the third transparent electrode 59, the PN liquid crystal 79 between the peripheral electrode 60 and the third transparent electrode 59 maintains the light scattering state. When the first transparent electrode 63 and the third transparent electrode 59 are set to the same potential, the PN liquid crystal 79 enters the light scattering state. Further, when the peripheral electrode 60 and the second transparent electrode 58 are set to the same potential, the PN liquid crystal 79 between the peripheral electrode 60 and the third transparent electrode 59 enters the light transmitting state. When the first transparent electrode 63 formed under the insulating layer 64 is used as the wiring, it is possible to intersect the second transparent electrode for forming an image with the wiring. In other words, a complex pattern for forming an image can be formed.

FIG. 13 is a cross-sectional view of a PN liquid crystal panel. PN liquid crystal 79 is injected in a clearance between two glass substrates 71 and 72. A display electrode 73a and a wiring electrode 73b are formed on the glass substrate 71. An insulating layer 74 and an outer electrode 75 are laminated on outer portion of the display electrode 73a. Also on the wiring electrode 73b, the insulating layer 74 and the outer electrode 75 are laminated. Also on the surface of the counter substrate 72, a display electrode 76a, a wiring electrode 76b, an insulating layer 77, and an outer electrode 78 are similarly formed. The counter substrate 72 is disposed so as to be opposed to the glass substrate 71. Display is performed by applying an electric field between the display electrodes 73a and 76a (for example, see JP 2007-133088 A). The wiring electrodes 73b and 76b are electrically blocked by the outer electrodes 75 and 78, respectively, and hence the regions corresponding to the wiring electrodes 73b and 76b are not displayed. That is, display is performed in a region 70B, and regions 70A become non-display regions. Further, no gap is formed between the outer electrode 75 (78) and the display electrode 73a (76a), and hence a boundary therebetween is invisible.

FIG. 14 illustrate a plane structure of a liquid crystal panel capable of simultaneously displaying isolated electrodes, which are surrounded by closed display electrodes, and an outer electrode (for example, see JP 2008-9386 A). On a substrate, a first transparent conductive layer, an insulating layer, and a second transparent conductive layer are laminated in the stated order. FIG. 14(a) is a plan view illustrating the second transparent conductive layer, FIG. 14(b) is a plan view illustrating the insulating layer, and FIG. 14(c) is a plan view illustrating the first transparent conductive layer. As illustrated in FIG. 14(c), on a glass substrate 910, wiring electrodes 911 and an outer electrode terminal 912 are formed of the first transparent conductive film. On the first transparent conductive film, as illustrated in FIG. 14(b), an insulating layer 930 in which through holes H1 to H4 are formed is provided. On the insulating layer, as illustrated in FIG. 14(a), mark electrodes 931, isolated electrodes 932, and an outer electrode 933 are formed of the second transparent conductive layer. The wiring electrode 911 and the mark electrode 931 are electrically connected to each other via the through hole H1, the isolated electrode 932 and the outer electrode 933 are electrically connected to each other via the through holes H2 and H4, and the outer electrode 933 and the outer electrode terminal 912 are electrically connected to each other via the through hole H3. With this structure, the isolated electrode 932 is set to the same potential as the outer electrode 933, and hence the isolated electrode 932 and the outer electrode 933 may perform the same display.

In the PN liquid crystal panel illustrated in FIG. 12, a gap is present between the second transparent electrode 58 and the peripheral electrode 60, and the PN liquid crystal in the gap region is in the light scattering state. Further, a part of the first transparent electrode 63 as the wiring electrode intersects with the gap region through intermediation of the insulating layer 64. Therefore, when a voltage is applied to the first transparent electrode 63 in order to cause the PN liquid crystal 79 on the second transparent electrode 58 to enter the light transmitting state, a voltage dropped due to the insulating layer 64 is applied to the surface of the insulating layer 64 at the gap of the intersecting portion. As a result, there occurs a trouble that a part of the gap region is half-lit. In order to prevent this phenomenon, it is effective to form the insulating layer 64 thick, but in this case, the manufacturing cost increases because, for example, a long time period is required to form the insulating layer 64, and also a long time period is required to form the contact hole 57.

In the PN liquid crystal panel illustrated in FIG. 13, the outer electrodes 75 and 78 and the display electrodes 73a and 76a are formed without a gap therebetween in a direction normal to the surface of the substrate. However, in actuality, it is extremely difficult to form the electrodes without a gap therebetween. In order to bring leading edge portions of the display electrodes 73a and 76a and leading edge portions of the outer electrodes 75 and 78 into a line, high accuracy mask alignment and high accuracy etching technology are necessary. As a result, an expensive manufacturing device is necessary, and it becomes impossible to avoid the cost increase.

In the liquid crystal panel illustrated in FIG. 14, the mark electrodes 931, the isolated electrodes 932, and the outer electrode 933 are formed of the second transparent conductive layer, and hence a clearance is generated between the mark electrode 931 and the isolated electrode 932, and similarly a clearance is generated between the mark electrode 931 and the outer electrode 933. The PN liquid crystal in those gaps is in the light scattering state, and the clearances become visible when the periphery thereof is in the light transmitting state, which degrades the display quality.

SUMMARY OF THE INVENTION

Therefore, the present invention has an object to realize a liquid crystal panel in which a gap between electrodes is invisible with a simple electrode structure.

A liquid crystal display device according to the present invention includes a liquid crystal display element including a pair of substrates sandwiching liquid crystal in a clearance therebetween, at least one of the substrates being transparent, in which, in a display region which is on an inner surface of one substrate and is visible from an outside: a substantially ring-shaped gap electrode, which has a clearance and a space inside, and a wiring electrode, which is electrically insulated from the gap electrode, are formed of a first conductive film; an insulating film is formed on the gap electrode and the wiring electrode; and on the insulating film, an outer second display electrode is formed so as to overlap with both outer edge portions of the gap electrode and a part of the wiring electrode, and a ring-shaped display electrode, which is separated in plan view and electrically insulated from the outer second display electrode, is formed so as to overlap with both inner edge portions of the gap electrode and another part of the wiring electrode, the outer second display electrode and the ring-shaped display electrode being formed of a second conductive film. The outer second display electrode is electrically connected to the gap electrode via a contact region provided in the insulating film. An inner second display electrode surrounded by the ring-shaped display electrode is electrically connected to the gap electrode via another contact region provided on the inner side. The display electrode is electrically connected to the wiring electrode via a further another contact region provided in the insulating film. In a display region on an inner surface of another transparent substrate, a counter electrode is formed.

Further, on the inner surface of the one substrate in an outer circumference edge portion, an electrode terminal for display, which is electrically connected to the wiring electrode, and a second display electrode terminal, which is electrically connected to the outer second display electrode, are formed. The electrode terminal for display and the second display electrode terminal are each formed of a single layer of a transparent conductive film by extending each of the wiring electrode and the second display electrode. Here, the structures of the electrode terminal for display and the second display electrode terminal may not be a single layer of the first or second conductive film as described above. That is, the display electrode terminal may be simultaneously formed with the outer second display electrode on the extending portion of the wiring electrode, and may have a laminate structure together with a second conductive film separated in plan view and electrically insulated or a second conductive film formed after the silicon dioxide thin film. Further, the second display electrode terminal may have a laminate structure in which, on a first conductive film of the extending portion, which is electrically insulated from the wiring electrode, a second conductive film electrically connected to the outer second display electrode, or a second conductive film formed after the silicon dioxide thin film is laminated.

DETAILED DESCRIPTION OF THE PREFERRED EMBODIMENTS

In a liquid crystal display device according to the present invention, a clearance electrode is provided correspondingly to a clearance between adjacent display electrodes. That is, a clearance electrode is provided on a substrate, and an insulating film is formed so as to cover the clearance electrode. The display electrodes are formed on the insulating film. When the same signal as that applied to one of the display electrodes forming the clearance is applied to the clearance electrode, the clearance electrode contributes to display similarly as the display electrode, and hence the aperture ratio increases. Therefore, the liquid crystal display device includes a substrate on which an insulating film is formed, a first display electrode and a second display electrode formed on the insulating film, a counter substrate on which a counter electrode is formed so as to be opposed to the first display electrode and the second display electrode, and a liquid crystal layer provided between the counter electrode and the first display electrode as well as the second display electrode. Between the substrate and the insulating film, a gap electrode is provided correspondingly to a clearance between the first display electrode and the second display electrode. Further, the gap electrode is supplied with the same driving signal as a driving signal supplied to one of the first display electrode and the second display electrode. The gap electrode and a display electrode of one of the first display electrode and the second display electrode are electrically connected to each other via a contact region provided in the insulating film.

Here, the first display electrode and the second display electrode are stripe-shaped electrodes which are adjacent to each other, and each form a pixel at an intersection with the counter electrode, to thereby perform matrix display.

Moreover, between the transparent substrate and the insulating film, a wiring electrode insulated from the gap electrode is formed, the first display electrode and the gap electrode are electrically connected to each other, the gap electrode is supplied with the same driving signal as a driving signal supplied to the first display electrode, and the second display electrode and the wiring electrode are electrically connected to each other. In this case, the gap electrode is electrically connected to the first display electrode via a contact region provided in the insulating film, and the wiring electrode is electrically connected to the second display electrode via another contact region provided in the insulating film.

EXAMPLE 1

Figure 1A:
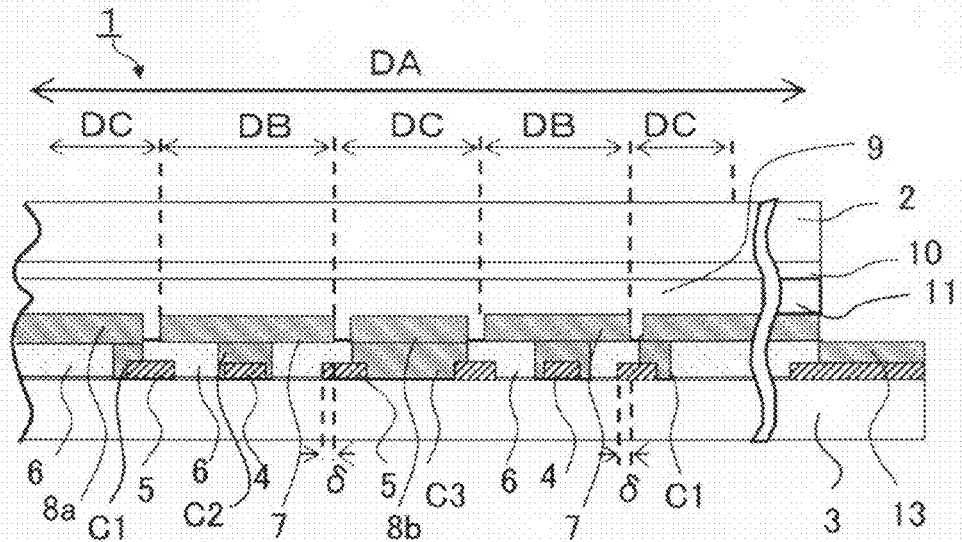
FIG. 1A is a partial cross-sectional view of a liquid crystal panel of Example 1.
Figure 1B:
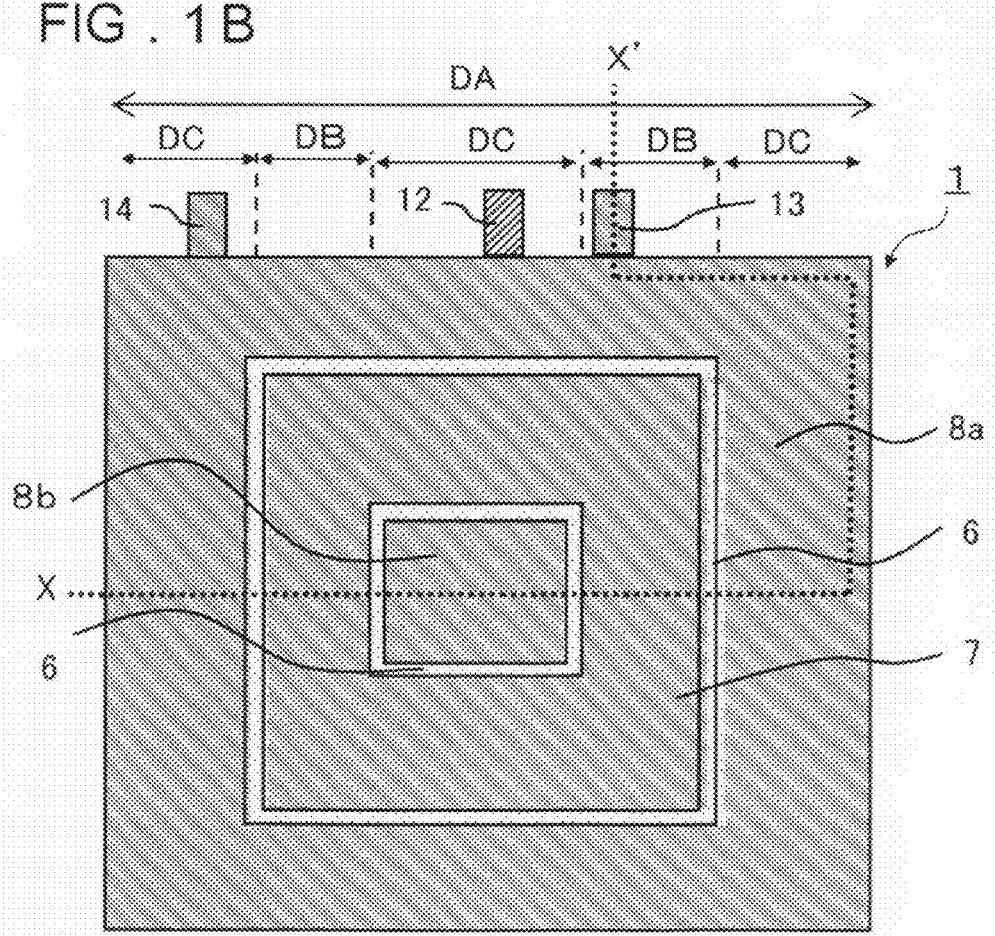
FIG. 1B is a schematic plan view partially illustrating the liquid crystal panel of Example 1.

A liquid crystal display device of this example is described with reference to FIGS. 1A and 1B. In the liquid crystal display device of this example, a plurality of display electrodes formed on a lower substrate 3 are combined to display various shapes (symbols). FIG. 1A is a cross-sectional view schematically illustrating a display region DA, which is a part of a display screen of a liquid crystal panel 1. FIG. 1B is a top view of the lower substrate 3, and schematically illustrates one unit pixel formed on the lower substrate 3. Further, FIG. 1A illustrates a cross-sectional structure taken along the line XX' of FIG. 1B. As illustrated in the figure, a liquid crystal layer 9 is sandwiched between an upper substrate 2 and the lower substrate 3. At least one of the upper substrate 2 and the lower substrate 3 is a transparent substrate. In the display region DA, a wiring electrode 4 and a gap electrode 5 are formed on the surface (liquid crystal layer side) of the lower substrate 3. An insulating film 6 is formed so as to cover those electrodes, and a first display electrode 7, an outer second display electrode 8a, and an inner second display electrode 8b are formed thereon. In the insulating film, there are formed a contact hole C2 for electrically connecting the first display electrode 7 and the wiring electrode 4, a contact hole C1 for electrically connecting the outer second display electrode 8a and the gap electrode 5, and a contact hole C3 for electrically connecting the inner second display electrode 8b and the gap electrode 5. The display electrode 7 overlaps the gap electrode 5 by a width δ.

Further, a counter electrode 10 is formed on the surface (liquid crystal layer side) of the upper substrate 2. In a terminal region of the lower substrate 3, there are formed a common electrode terminal 14 electrically connected to the counter electrode 10 of the upper substrate 2, a first electrode terminal 12 electrically connected to the wiring electrode 4, and a second electrode terminal 13 electrically connected to the second display electrodes 8 and the gap electrode 5. Each of the second electrode terminal 13, the common electrode terminal 14, and the first electrode terminal 12 is electrically insulated.

Figure 2A:
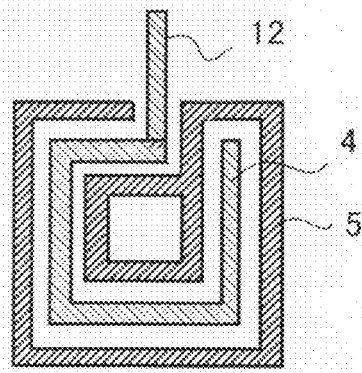
FIG. 2A is a schematic view illustrating shapes of electrodes of Example 1.
Figure 2B:
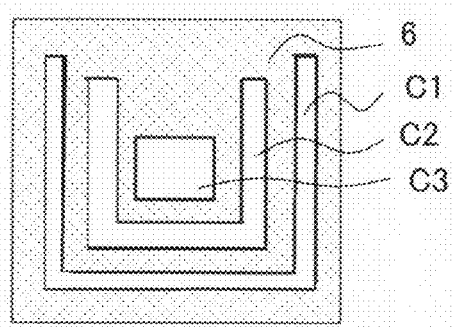
FIG. 2B is a schematic view illustrating a shape of an insulating film of Example 1.
Figure 2C:
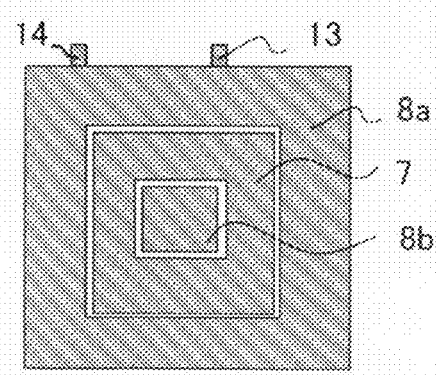
FIG. 2C is a schematic view illustrating shapes of display electrodes of Example 1.

The shapes of those electrodes and the insulating film are described with reference to FIGS. 2A-2C. FIG. 2A is a plan view schematically illustrating the shapes of the wiring electrode 4 and the gap electrode 5, FIG. 2B is a plan view schematically illustrating the shape of the insulating film 6, and FIG. 2C is a plan view schematically illustrating the shapes of the electrodes formed on the insulating film 6. On the surface of the lower substrate 3, the gap electrode 5 and the wiring electrode 4, which is electrically insulated from the gap electrode 5, are formed of a first conductive film. The gap electrode 5 includes a substantially ring-shaped electrode having a space inside, and a small ring-shaped electrode formed inside the substantially ring-shaped electrode. The wiring electrode 4 passes through a clearance in the gap electrode 5, and is formed between the substantially ring-shaped electrode and the small ring-shaped electrode. The wiring electrode 4 is extended so as to reach the edge portion of the lower substrate 3, and the edge portion of the wiring electrode 4 forms the first electrode terminal 12. Wiring formed of the first conductive film is not connected to the gap electrode 5. Further, the first electrode terminal 12, the second electrode terminal 13, and the common electrode terminal 14 illustrated in FIG. 1B are simultaneously formed of the first conductive film. On the surface of the lower substrate 3, the insulating film 6 is formed so as to cover the gap electrode 5 and the wiring electrode 4. As illustrated in FIG. 1A, the insulating film 6 is formed on substantially the entire surface in the display region DA. However, as illustrated in FIG. 2B, the insulating film 6 is removed in portions corresponding to the contact regions C1, C2, and C3.

Note that, although the insulating film 6 is formed on the gap electrode 5, it is possible to reduce the voltage drop due to the insulating film 6 by forming the insulating film 6 thin, by increasing the areas of the contact regions C1, C2, and C3 to increase the contact area between the wiring electrode 4 and the display electrode 7, the contact area between the gap electrode 5 and the outer second display electrode 8a, and the contact area between the gap electrode 5 and the inner second display electrode 8b, or by using an insulating material having large dielectric constant.

With reference to FIGS. 1B and 2C, the shapes of the first display electrode 7, the outer second display electrode 8a, and the inner second display electrode 8b are described. The first display electrode 7 has a ring shape, which is completely surrounded by the outer second display electrode 8a and completely surrounds the inner second display electrode 8b. The display electrodes are formed to be electrically insulated on the insulating film. The outer second display electrode 8a and the inner second display electrode 8b are electrically connected to each other via the gap electrode 5. Further, the first display electrode 7 is electrically connected to the wiring electrode 4 via the contact region C2, and is formed so as to overlap with the gap electrode 5 by the overlapping width δ. In the region of the overlapping width δ, the insulating film 6 is present, and hence the first display electrode 7 is electrically insulated from the gap electrode 5. The overlapping width δ is only required to be set larger than the alignment accuracy of the first display electrode 7 with respect to the gap electrode 5.

The outer second display electrode 8a is formed so as to completely surround the first display electrode 7, and also forms the second electrode terminal 13 in the terminal region. Further, the outer second display electrode 8a is formed so as to partially overlap the gap electrode 5, and is electrically connected to the gap electrode 5 via the contact region C1. The overlapping width between the outer second display electrode 8a and the gap electrode 5 in this case may be arbitrarily set, but the contact resistance decreases as the overlapping width increases. In this manner, the voltage drop may be suppressed, and hence good display performance is obtained.

The inner second display electrode 8b is formed so as to be completely surrounded by the first display electrode 7, and is formed so as to be electrically connected to the gap electrode 5 via the contact region C3. The overlapping width between the gap electrode 5 and the inner second display electrode 8b in this case may be arbitrarily set, but the contact resistance decreases as the overlapping width increases. In this manner, the voltage drop may be suppressed, and hence good display performance is obtained. With this structure, the inner second display electrode 8b, the gap electrode 5, and the outer second display electrode 8a can be set to the same potential. Therefore, when the first display electrode 7, the outer second display electrode 8a, and the inner second display electrode 8b are caused to perform display, a non-display portion is not generated between the display electrodes. In 2A, the gap electrode 5 disposed under the second inner display electrode 8b has a ring shape, but may have a solid shape without a hole.

Figure 3A:
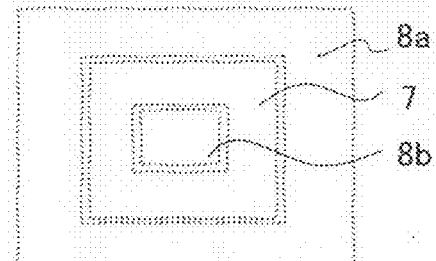
FIG. 3A is a schematic view illustrating a display state having a light transmitting state in all regions.
Figure 3B:
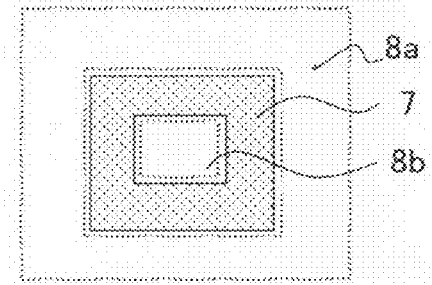
FIG. 3B is a schematic view illustrating a display state having a light scattering state with the light transmitting state in the background.
Figure 3C:
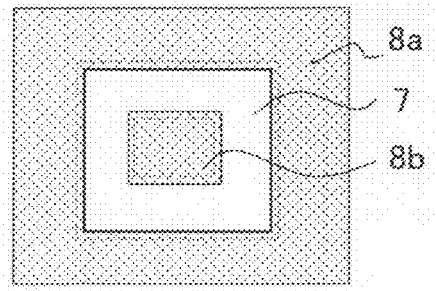
FIG. 3C is a schematic view illustrating a display state having the light transmitting state with the light scattering state in the background.

As illustrated in FIG. 1A, in the liquid crystal panel 1, the lower substrate 3 having the above-mentioned structure and the upper substrate 2 on which the counter electrode 10 is formed on the surface thereof on the liquid crystal side are adhered to each other by a sealing material 11. The liquid crystal layer 9 is filled in the clearance therebetween. FIGS. 3A-3C are schematic views illustrating display states when PN liquid crystal is used as the liquid crystal layer 9. When a voltage is applied between the first display electrode 7 and the counter electrode 10, the PN liquid crystal therebetween is applied with an electric field, and hence a light scattering state is changed to a light transmitting state. Then, when the outer second display electrode 8a and the inner second display electrode 8b are set to the same potential as the counter electrode, the light scattering state is maintained, to thereby realize the display of the light transmitting state with the light scattering state in the background. This corresponds to a display state illustrated in FIG. 3C. On the other hand, when a voltage is applied to the outer second display electrode 8a and the inner second display electrode 8b so as to set the first display electrode 7 and the counter electrode 10 to have the same potential, it is possible to realize the display of the light scattering state with the light transmitting state in the background. This corresponds to a display state illustrated in FIG. 3B. Further, FIG. 3A illustrates a display state in a case where a voltage is applied between the counter electrode 10 and the first display electrode 7, the outer second display electrode 8a, and the inner second display electrode 8b, which has the light transmitting state in all regions of the display electrodes. As described above, the PN liquid crystal panel performs display operation by switching between the light scattering state and the light transmitting state, and hence the polarizing plate is unnecessary.

When the PN liquid crystal panel is caused to perform display, no gap is formed between the first display electrode 7 and the outer second display electrode 8a as well as the inner second display electrode 8b, and further, the wiring electrode 4 is covered with the outer second display electrode 8a in the display region DA. Therefore, the PN liquid crystal above the wiring electrode 4 is not half-lit. At a part between the patterns of the first display electrode 7 and the outer second display electrode 8a, there is a portion where the patterns do not overlap with the gap electrode 5 and neither of the electrodes are present, which results to always be in the light scattering state. However, by forming the region between the patterns of the first display electrode 7 and the outer second display electrode 8a to be a minute region which can be accomplished by a general pattern forming technology without using an advanced technology, the ring shape of the first display electrode 7 to be displayed is not greatly changed.

As described above, the edge portion of the gap electrode and the wiring electrode are covered with the first display electrode and the outer second display electrode, and hence a region different in light scattering concentration is not generated, which occurs when the PN liquid crystal in a region where the wiring electrode is formed is not applied with an electric field from the wiring electrode. Further, the inner second display electrode surrounded by the first display electrode can perform the same display as the outer second display electrode. Further, the edge portion of the first display electrode and the edge portion of each of the second display electrodes are not required to be brought into a line, and hence high accuracy mask alignment and high accuracy etching treatment are unnecessary. Therefore, the manufacturing method is simplified, and the manufacturing cost may be reduced.

Here, as the PN liquid crystal, ultraviolet (hereinafter, abbreviated to UV) polymerizable polymer resin and nematic liquid crystal are mixed and then irradiated with UV light to form a polymer network. The grain diameter of the polymer network is larger than the wavelength of visible light, and is basically set to 1 µm or larger. Further, the thickness of the PN liquid crystal layer is set to several micrometers to several tens of micrometers. Further, for the wiring electrode 4, the gap electrode 5, the first display electrode 7, the outer second display electrode 8a, the inner second display electrode 8b, and the counter electrode 10, a transparent conductive film such as an ITO, a tin oxide, and a zinc oxide may be used. For the insulating film 6, a silicon dioxide film, a silicon oxide film, a silicon nitride film, other metallic oxides, and a transparent polymer resin film made of, for example, an acrylic transparent resin may be used. Further, the overlapping width δ between the edge portions of the gap electrode 5 and the first display electrode 7 is only required to be set larger than the alignment accuracy of the pattern of the first display electrode 7 with respect to the gap electrode 5. Further, on the liquid crystal layer side of the upper substrate 2, the wiring electrode 4, the gap electrode 5, the insulating film 6, the first display electrode 7, the outer second display electrode 8a, and the inner second display electrode 8b may be formed, and on the liquid crystal layer side of the lower substrate 3, the counter electrode 10 may be formed.

Further, by forming the electrode group, such as the wiring electrode 4, the gap electrode 5, the first display electrode 7, the outer second display electrode 8a, the inner second display electrode 8b, the first electrode terminal 12, the second electrode terminal 13, and the common electrode terminal 14, of chromium or aluminum to be a metal electrode, a reflective liquid crystal panel 1 may be obtained. Further, the counter electrode 10 may be a metal electrode.

Note that, in a case where a silicon dioxide film is used as the insulating film 6, which is formed by a vacuum film forming method such as a sputtering method, so as to cover the wiring electrode 4 and the gap electrode 5, the contact regions C1, C2, and C3 are formed by a lift-off method. Alternatively, with the use of a mask, a silicon dioxide film may be prevented from being formed in portions corresponding to the contact regions C1, C2, and C3. The thickness of the insulating film 6 is preferred to be 30 nm to 200 nm. When the thickness of the insulating film 6 is 30 nm or smaller, an insulation breakdown or electric leakage may easily occur between the wiring electrode 4 or the gap electrode 5 and the first display electrode 7, the outer second display electrode 8a, and the inner second display electrode 8b. When the thickness is 500 nm or larger, the voltage drop due to the insulating film 6 on the gap electrode 5 increases.

Further, the patterns of the display electrodes may be freely set to shapes such as characters, signals, and symbols as necessary.

EXAMPLE 2

Figure 4A:
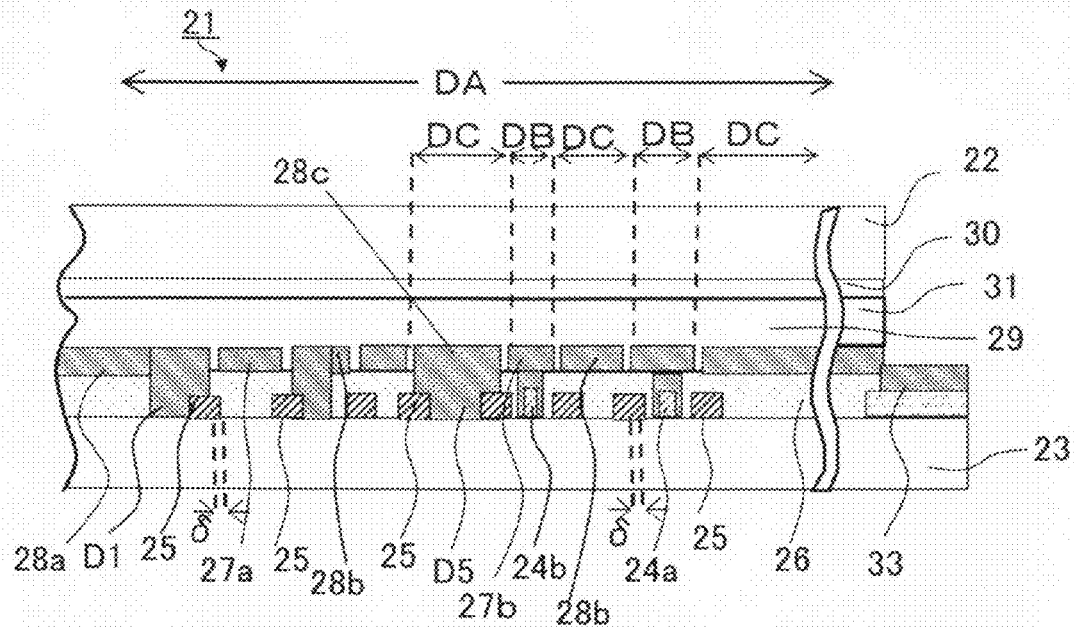
FIG. 4A is a partial cross-sectional view of a liquid crystal panel of Example 2.
Figure 4B:
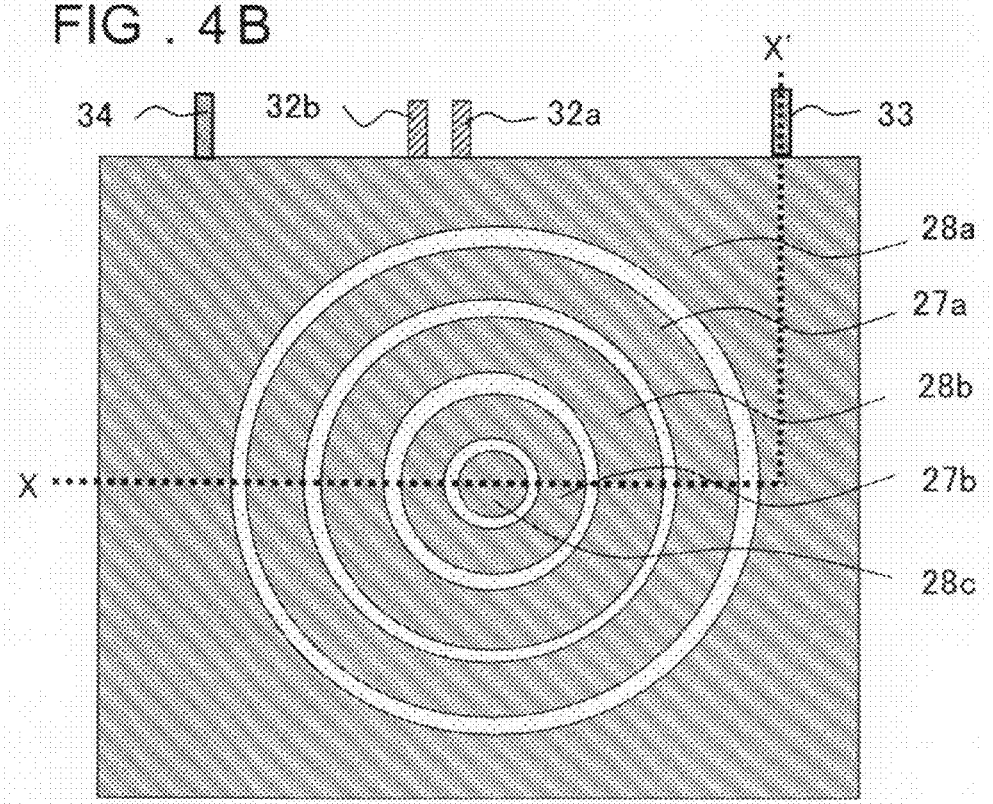
FIG. 4B is a schematic plan view partially illustrating the liquid crystal panel of Example 2.
Figure 5A:
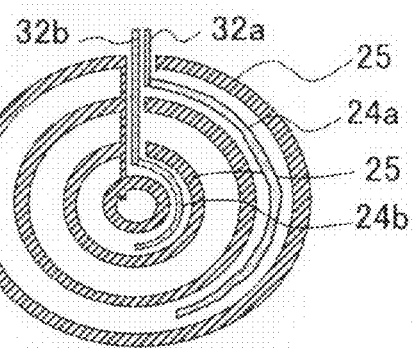
FIG. 5A is a schematic view illustrating shapes of electrodes of Example 2.
Figure 5B:
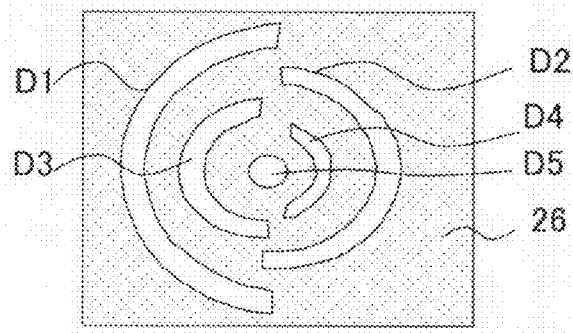
FIG. 5B is a schematic view illustrating a shape of an insulating film of Example 2.
Figure 5C:
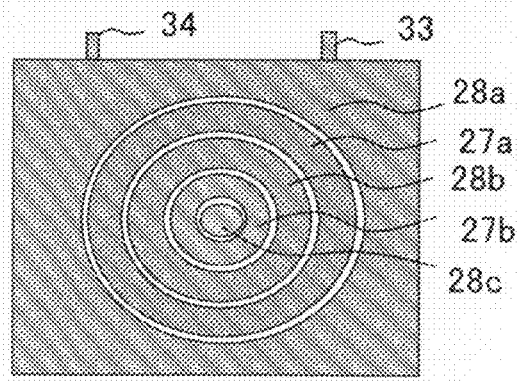
FIG. 5C is a schematic view illustrating shapes of display electrodes of Example 2.

FIGS. 4A-4C are views illustrating a PN liquid crystal panel 21 according to this example. Similarly to Example 1, FIG. 4A is a schematic cross-sectional view of the PN liquid crystal panel 21 taken along the line XX' of a lower transparent substrate 23 illustrated in FIG. 4B, and FIG. 4B is a schematic plan view of the lower transparent substrate 23. FIG. 5A is a schematic plan view of wiring electrodes 24a and 24b and a gap electrode 25, and FIG. 5B is a schematic plan view of an insulating film 26. FIG. 5C is a schematic plan view of first display electrodes 27a and 27b, an outer second display electrode 28a., and inner second display electrodes 28b .and 28c.

With reference to FIG. 4 and FIG. 5, the electrode structure of the lower transparent substrate 23 is described. As illustrated in FIGS. 4A and 4B, on the surface of the lower transparent substrate 23 in the display region DA, the wiring electrodes 24a .and 24b.and the gap electrode 25 are formed, the insulating film 26 is formed thereon, and the first display electrodes 27a and 27b, the outer second display electrode 28a, and the inner second display electrodes 28b and 28c are formed thereon. Further, in a terminal region of the lower transparent substrate 23, there are formed first electrode terminals 32a and 32b, a second electrode terminal 33, and a common electrode terminal 34 which is electrically connected to a counter electrode 30. The second electrode terminal 33 and the common electrode terminal 34 are formed in patterns so as to be electrically insulated from each other.

As illustrated in FIG. 5A, the gap electrode 25 made of a first conductive film is formed on the surface of the lower transparent substrate 23. The gap electrode 25 includes electrodes having a double substantially ring shape with spaces inside, and at an innermost portion thereof, a completely closed small ring-shaped electrode. The electrodes having a double ring shape are electrically connected to each other. The wiring electrodes 24a and 24b are each formed in a space region inside the electrodes while passing through a clearance between the electrodes having a double ring shape. The wiring electrodes 24a and 24b are extended so as to reach the edge portion of the lower transparent substrate 23, and the edge portions of the wiring electrodes 24a and 24b form the first electrode terminals 32a and 32b, respectively. The gap electrode 25 does not have a terminal. Further, the second electrode terminal 33 and the common electrode terminal 34, which are electrically insulated from the first electrode terminals 32a and 32b, illustrated in FIG. 4B are also formed of the first conductive film.

The insulating film 26 is formed on substantially the entire surface of the display region DA so as to cover the wiring electrodes 24a and 24b and the gap electrode 25. However, as illustrated in FIG. 5B, the insulating film 26 is removed in portions corresponding to contact regions D1 to D5.

With reference to FIG. 4B, the first display electrodes 27a and 27b, the outer second display electrode 28a, and the inner second display electrodes 28b and 28c are described. The ring-shaped first display electrode 27a is completely surrounded by the second display electrode 28a, and completely surrounds the inner second display electrode 28b. Further, the ring-shaped first display electrode 27a is electrically connected to the wiring electrode 24a via the contact region D2, and overlaps the gap electrode 25 by a width δ. The insulating film 26 is present in the region of the overlapping width δ, and hence the first display electrode 27a and the gap electrode 25 are electrically insulated from each other. The overlapping width δ is only required to be set larger than the alignment accuracy of the first display electrode with respect to the gap electrode 25.

The outer second display electrode 28a is formed so as to completely surround the first display electrodes 27a and 27b, and also forms the second electrode terminal 33 in an outer circumference portion of the lower transparent substrate 23.

The first electrode terminals 32a and 32b and the common electrode terminal 34 are formed so as to be electrically insulated. Further, the outer second display electrode 28a is formed so as to overlap and be electrically connected to the gap electrode 25 via the contact region D1. The overlapping width between the outer second display electrode 28a and the gap electrode 25 in this case may be arbitrarily set, but the electrical contact resistance decreases as the overlapping width increases. In this manner, the voltage drop may be suppressed, and hence good display performance is obtained.

The inner second display electrode 28b is formed so as to be completely surrounded by the first display electrode 27a, and is formed so as to be electrically connected to the gap electrode 25 via the contact region D3. The overlapping width between the gap electrode 25 and the inner second display electrode 28b in this case may be arbitrarily set, but the contact resistance decreases as the overlapping width increases. In this manner, the voltage drop may be suppressed, and hence good display performance is obtained.

The ring-shaped first display electrode 27b has a shape that is completely surrounded by the inner second display electrode 28b and completely surrounds the inner second display electrode 28c, and is formed so as to be electrically insulated. Further, the ring-shaped first display electrode 27b is formed so as to cover the leading end portion of the wiring electrode 24b via the contact region D4 so as to be electrically connected to the wiring electrode 24b. Further, the ring-shaped first display electrode 27b is formed so as to overlap with both inner edge portions of the gap electrode 25 in the space thereof by a width δ. In the region of the overlapping width δ, the insulating film 26 is present, and hence the ring-shaped first display electrode 27b and the gap electrode 25 are electrically insulated from each other. The overlapping width 5 is only required to be set larger than the alignment accuracy of the first display electrode with respect to the gap electrode 25.

The inner second display electrode 28c is formed so as to be completely surrounded by the inner first display electrode 27b, and is formed so as to be electrically connected to the gap electrode 25 via the contact region D5. The overlapping width between the gap electrode 25 and the inner second display electrode 28c in this case may be arbitrarily set, but the contact resistance decreases as the overlapping width increases. In this manner, the voltage drop may be suppressed, and hence good display performance is obtained. In FIG. 5(a), the gap electrode 25 disposed under the inner second display electrode 28c has a ring shape, but may be provided without a hole. With the structure above, the inner second display electrode 8c may be set to have the same potential as the outer second display electrode 28a and the inner second display electrode 28b due to electrical connection to the gap electrode 25. With such an electrode structure, no gap is formed between the display portion and the non-display portion as described above.

Figure 6A:
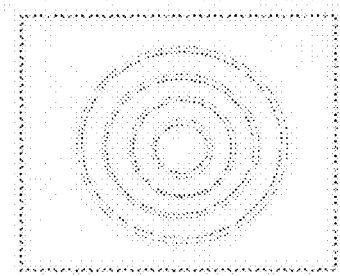
FIG. 6A is a schematic view illustrating a display state having a light transmitting state in all regions.
Figure 6B:
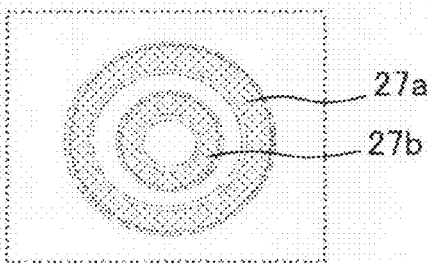
FIG. 6B is a schematic view illustrating a display state having a light scattering state with the light transmitting state in the background.
Figure 6C:
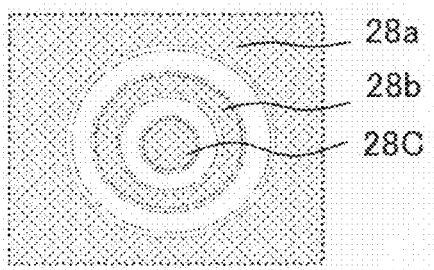
FIG. 6C is a schematic view illustrating a display state having the light transmitting state with the light scattering state in the background.

As illustrated in FIG. 4A, in the PN liquid crystal panel 21, the lower transparent substrate 23 having the above-mentioned structure and an upper transparent substrate 22 on which the counter electrode 30 formed of a transparent conductive film is formed on the surface thereof on the liquid crystal side are adhered to each other by a sealing material 31. The PN liquid crystal layer 29 is filled in a clearance therebetween. When a voltage is applied between the counter electrode 30 and the first display electrodes 27a and 27b, the PN liquid crystal 29 therebetween is applied with an electric field, and hence a light scattering state is changed to a light transmitting state. Then, by setting the outer second display electrode 28a and the inner second display electrodes 28b and 28c to have the same potential as the counter electrode 30, the display of the light transmitting state with the light scattering state in the background is realized. This corresponds to a display state illustrated in FIG. 6C. On the other hand, when a voltage is applied to the outer second display electrode 28a and the inner second display electrodes 8b and 8c so as to set the first display electrodes 27a and 27b and the counter electrode 30 to have the same potential, it is possible to realize the display of the light scattering state with the light transmitting state in the background. This corresponds to a display state illustrated in 6B. Further, FIG. 6A illustrates a display state in a case where a voltage is applied to the first display electrodes 27a and 27b, the outer second display electrode 28a, the inner second display electrodes 28b and 28c, and the counter electrode 30, in which light is transmitted in all regions of the PN liquid crystal panel 21. As described above, the PN liquid crystal panel 21 performs display operation by switching between the light scattering state and the light transmitting state, and hence the polarizing plate is unnecessary.

Note that, as the insulating film 26, a photosensitive acrylic polymer resin is used, which is formed by a spinner method over the entire upper surface of the wiring electrodes 24a and 24b and the gap electrode 25, and then the respective contact regions D1 to D5 are formed by a photolithography method. The thickness of the insulating film 26 is preferred to be 0.1 µm to 0.5 µm. When the thickness of the insulating film 26 is 0.1 µm or smaller, an insulation breakdown or electric leakage may easily occur between the wiring electrodes 24a, 24b or the gap electrode 25 and the first display electrodes 27 and the second display electrodes 28. When the thickness is 0.5 µm or larger, the voltage drop due to the insulating film 26 on the gap electrode 25 increases.

Further, a second conductive layer forming the first display electrodes 27a and 27b, the outer second display electrode 28a, and the inner second display electrodes 28b and 28c may be a single layer made of ITO, or a continuously laminated layer, which is formed for the purpose of increasing adhesion with respect to the insulating film 26 and the like, in which, for example, ITO is formed on a transparent inorganic oxide such as an SiO₂ layer. In this case, the thickness of the SiO₂ layer is set to 20 Å to 1,000 Å, and is preferred to be 30 Å to 300 Å.

Further, the patterns of the first display electrodes 27a and 27b may be freely set to shapes such as characters, signals, and symbols as necessary. Further, in the terminal region of the lower transparent substrate 23, other than the first electrode terminals 32a and 32b and the second electrode terminal 33, the common electrode terminal 34 which is electrically connected to the counter electrode 30 of the upper transparent substrate 22 is formed.

In the above, the double ring-shaped display electrode has been described, but a triple ring-shaped display electrode or a display electrode of more ring shapes can also be realized.

EXAMPLE 3

Figure 7A:
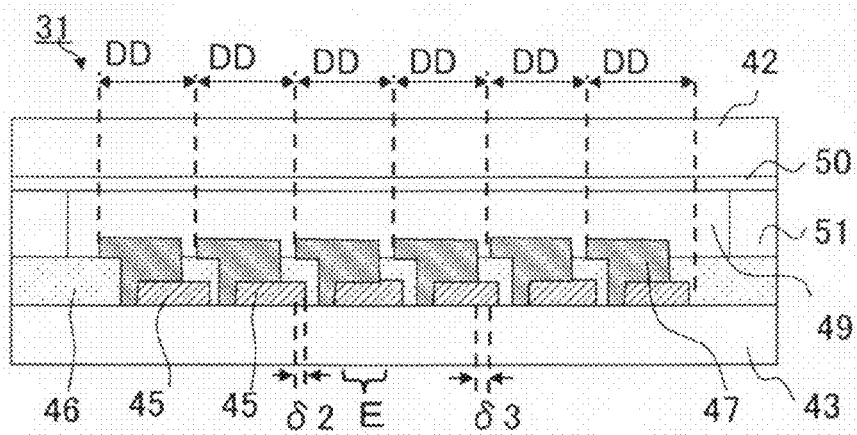
FIG. 7A is a cross-sectional view of a liquid crystal panel of Example 3 in an X direction.
Figure 7B:
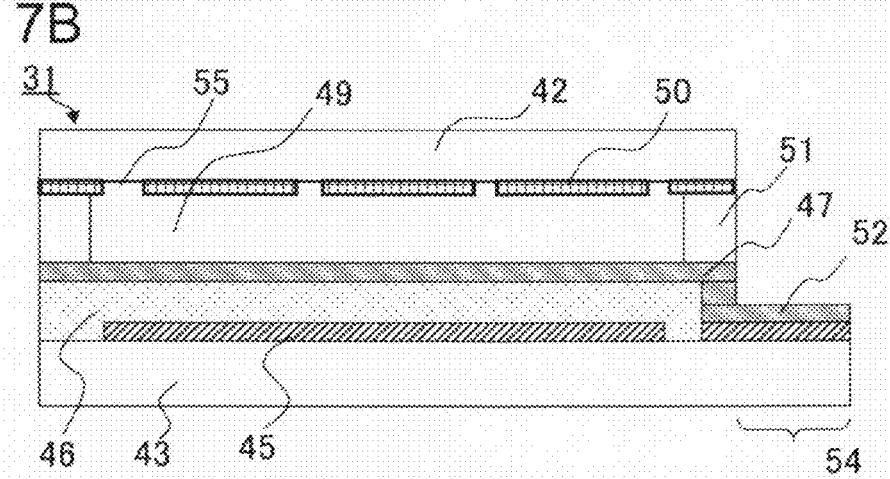
FIG. 7B is a cross-sectional view of the liquid crystal panel of Example 3 in a Y direction.
Figure 7C:
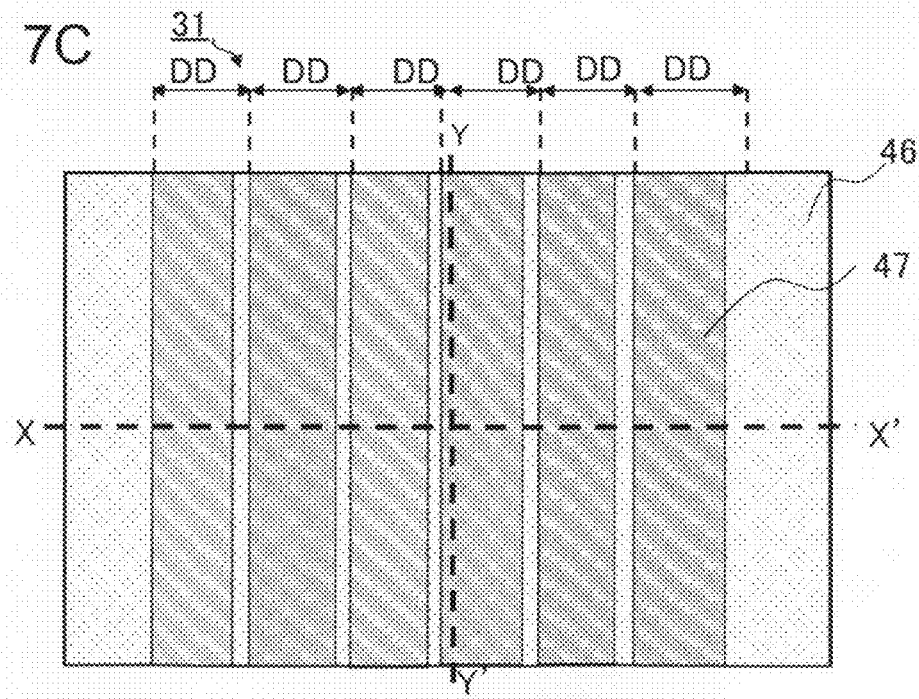
FIG. 7C is a schematic plan view of the liquid crystal panel of Example 3.

A liquid crystal panel 31 of this example is described with reference to FIGS. 7A-7C. In this example, a structure is provided in which stripe-shaped electrodes are opposed to one another, and intersecting portions become display pixels. FIGS. 7A and 7B are schematic views illustrating a cross-sectional structure of the liquid crystal panel 31. FIG. 7C is a schematic top view of a lower substrate 43. FIG. 7A is a cross-sectional view of the liquid crystal panel 31 taken along the line XX' of FIG. 7C, and FIG. 7B illustrates a vertical cross section of the liquid crystal panel 31 taken along the line YY' of FIG. 7C. As illustrated in the figures, a liquid crystal layer 49 is sandwiched between an upper substrate 42 and a lower substrate 43. At least one of the upper substrate 42 and the lower substrate 43 is a transparent substrate.

With reference to FIGS. 7A-7C, the electrode structure of the lower substrate 43 and the liquid crystal panel 31 using the lower substrate are described. As illustrated in FIG. 7C, display regions DD on the surface of the lower substrate 43 have stripe shapes, similarly to a general passive liquid crystal panel. On the surface of the lower substrate 43, a plurality of gap electrodes 45 are formed, an insulating film 46 is formed thereon, and as many display electrodes 47 as the gap electrodes 45 are formed thereon. Further, in a terminal region 54 of the lower substrate 43, there are formed a display electrode terminal 52 and a common electrode terminal for electrical connection to a counter electrode 50. The common electrode terminal is formed so as to be electrically insulated from the display electrode terminal 52.

As illustrated in FIGS. 7A and 7B, on the lower substrate 43, a plurality of lines of stripe-shaped gap electrodes 45 are formed of a first conductive film. It is unnecessary to provide wiring for supplying a voltage to the gap electrodes 45 on the lower substrate 43. Further, the insulating film 46 is provided on the lower substrate 43 so as to cover the plurality of gap electrodes 45. Note that, as illustrated in FIG. 7A, the insulating film 46 is removed in portions corresponding to contact regions E which electrically connects the gap electrodes 45 and the display electrodes 47 to each other.

With reference to FIGS. 7A and 7B, the structure of the display electrode 47 is described. The display electrode 47 is formed of a second conductive film, which is formed after the insulating film 46 is formed. The display electrode 47 is electrically connected to the gap electrode 45 via the contact region E. Further, the display electrode 47 is formed so as to overlap with the adjacent gap electrode 45 through intermediation of the insulating film 46 by a width δ2, and is formed so as to be apart from the adjacent display electrode 47 by a width δ3. The overlapping width δ2 and the clearance δ3 between the display electrodes 47 are only required to be set larger than the alignment accuracy of the display electrode 47 with respect to the gap electrode 45. Further, the length of the gap electrode 45 and the length of the contact region E may be arbitrarily set, but by increasing the contact area between the gap electrode 45 and the display electrode 47, the voltage drop may be suppressed, and hence good display performance is obtained.

As illustrated in FIGS. 7A and 7B, in the liquid crystal panel 31, the lower substrate 43 having the above-mentioned structure and the upper substrate 42 on which the counter electrodes 50 formed in stripe shapes are formed on the surface thereof on the liquid crystal side are adhered to each other by a sealing material 51. The counter electrodes 50 are provided orthogonal to the display electrodes 47, and intersections therebetween are the display pixels. The liquid crystal layer 49 is provided in a clearance between the upper substrate 42 and the lower substrate 43. Here, as the liquid crystal layer 49, there may be exemplified PN liquid crystal, TN liquid crystal, STN liquid crystal, VA liquid crystal, and the like, which enables display in passive driving. An alignment film or a polarizing plate may be necessary depending on the types of the liquid crystal, but those are omitted in FIGS. 7A and 7B.

Figure 8:
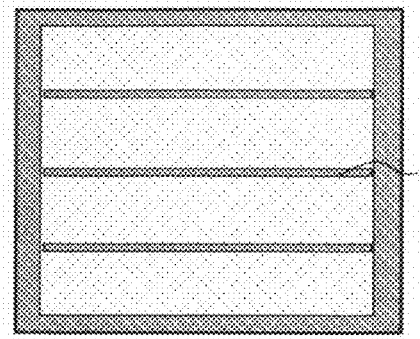
FIG. 8 is a schematic view illustrating a display state of the liquid crystal panel of Example 3.

FIG. 8 schematically illustrates a display state of the liquid crystal panel in a normally black mode. FIG. 8 illustrates a display state in a case where an electric field is applied between the display electrodes 47 and the counter electrodes 50. The display electrodes 47 and the gap electrodes 45 are set to the same potential due to the contact regions E, and hence an electric field is applied in all respective DD regions. That is, not only the display pixel but also a clearance between the adjacent display electrodes 47 is in the light transmitting state. On the other hand, an electric field is not applied between the display electrode 47 and a clearance 55 between the adjacent counter electrodes 50, and hence this portion remains in the light blocking state. Therefore, as illustrated in the figure, black stripes (non-display portions) in a vertical direction do not appear.

Further, when the display electrode 47 and the counter electrode 67 are set to the same potential, in each region of DD, an electric field is not applied to the liquid crystal layer 49 therebetween, and hence the light blocking state is maintained. Display in this case becomes the same as a conventional display.

Figure 10A:
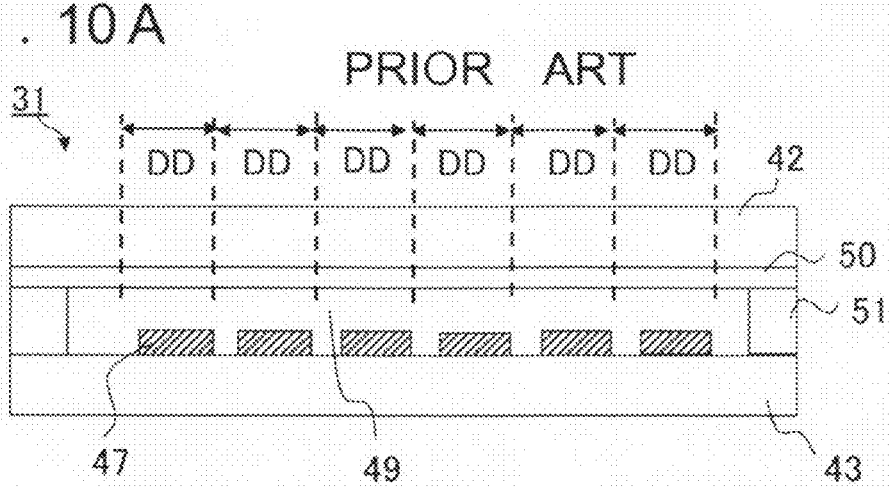
FIG. 10A is a cross-sectional view of a conventional dot-matrix liquid crystal panel in an X direction.
Figure 10B:
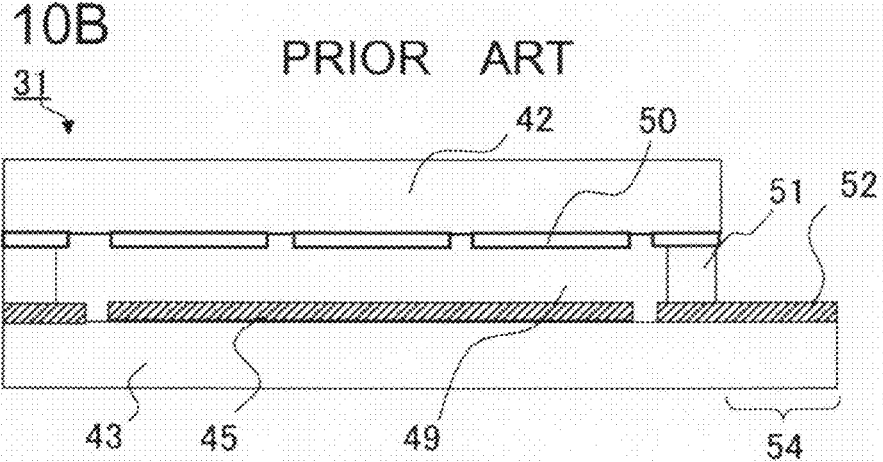
FIG. 10B is a cross-sectional view of the conventional dot-matrix liquid crystal panel in a Y direction.
Figure 11:
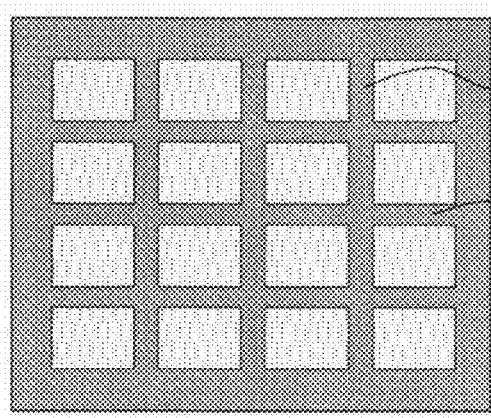
FIG. 11 is a schematic view illustrating a display state of the conventional dot-matrix liquid crystal panel.
Figure 12:
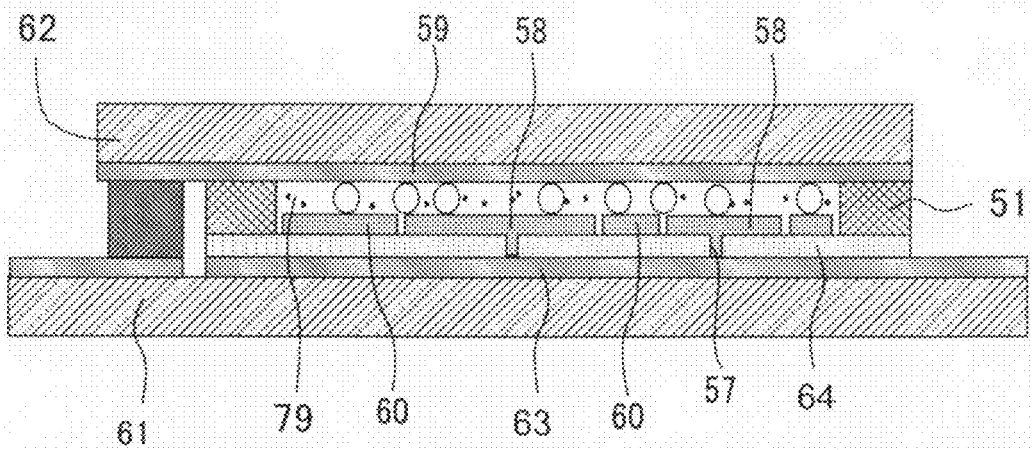
FIG. 12 is a schematic cross-sectional view of a conventional liquid crystal panel.
Figure 13:
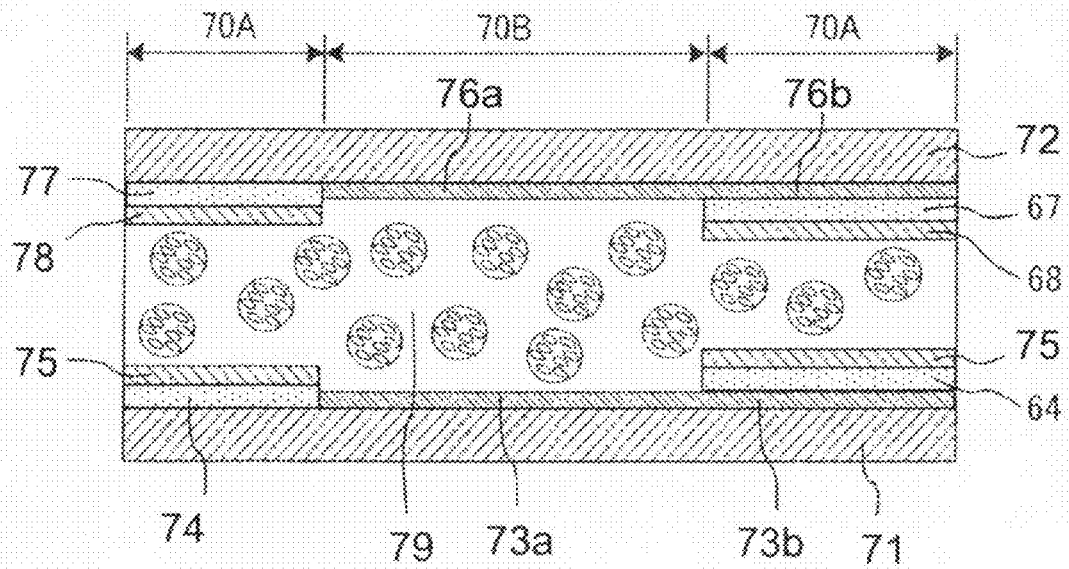
FIG. 13 is a schematic cross-sectional view of a conventional liquid crystal panel.
Figure 14A:
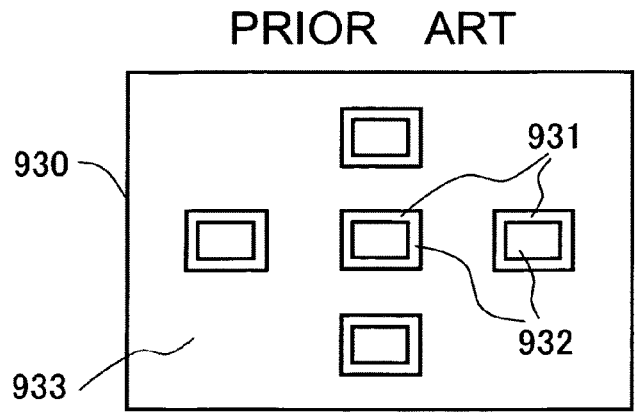
FIG. 14A is a schematic view illustrating shapes of electrodes formed of a second conductive layer of a conventional liquid crystal panel.
Figure 14B:
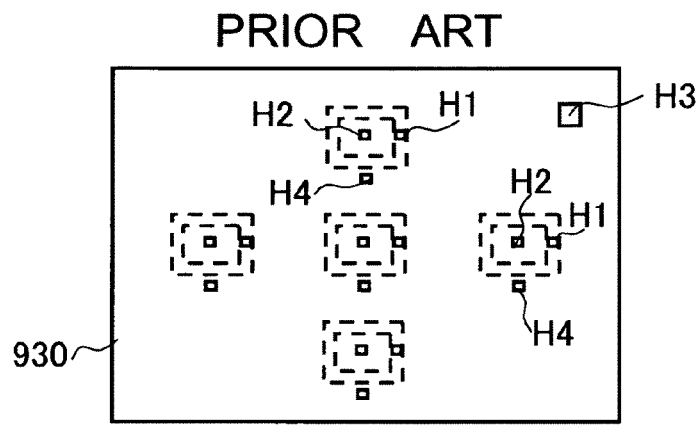
FIG. 14B is a schematic view illustrating a shape of an insulating layer of the conventional liquid crystal panel.
Figure 14C:
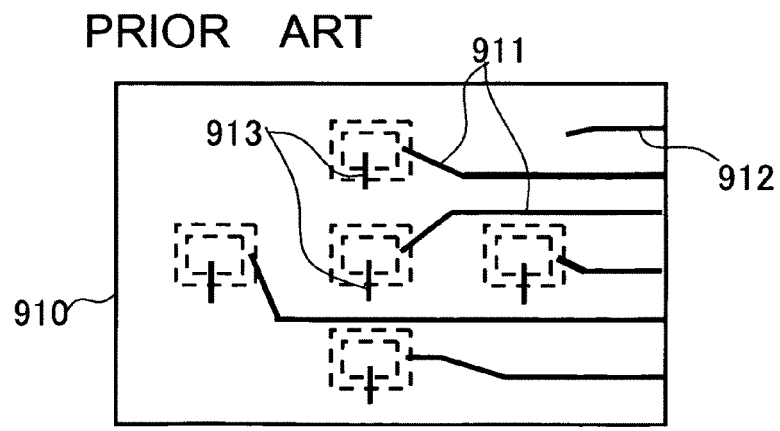
FIG. 14C is a schematic view illustrating shapes of electrodes formed of a first conductive layer of the conventional liquid crystal panel.

Here, for comparison with this example, display in a conventional liquid crystal panel is described. FIGS. 10A-10B are schematic cross-sectional views of a general liquid crystal panel. FIG. 11 illustrates a display state of the liquid crystal panel. FIG. 10A illustrates a cross section in an X direction, and FIG. 10B illustrates a cross section in a Y direction. In this liquid crystal panel, when an electric field is applied between the display electrode 47 and the counter electrode 50, a display pixel at the intersection between the display electrode 47 and the counter electrode 50 enters a transparent state. The clearance between the adjacent display electrodes and the clearance between the adjacent counter electrodes are not applied with an electric field, and hence remains in a light blocking state. As described above, in a passive liquid crystal panel which uses a conventional display electrode line pattern, not only the clearance 55 between the counter electrode lines but also a clearance 56 between the display electrode lines are in a light blocking state, and hence do not contribute to display. Therefore, the aperture ratio decreases.

In the above, a case of normally black mode display is described, but in a case of a normally white mode display, it is needless to say that the light transmitting state and the light blocking state are reversed. Note that, the insulating film 46 uses a photosensitive acrylic polymer resin similarly to Example 2. Subsequent contents are similar to those in Example 2, and hence description thereof is omitted.

As described above, with the electrode structure of this example, in the region DD, no gap is formed between the display portion and the non-display portion as described above, and hence the aperture ratio increases to increase the luminance.

EXAMPLE 4

Figure 9A:
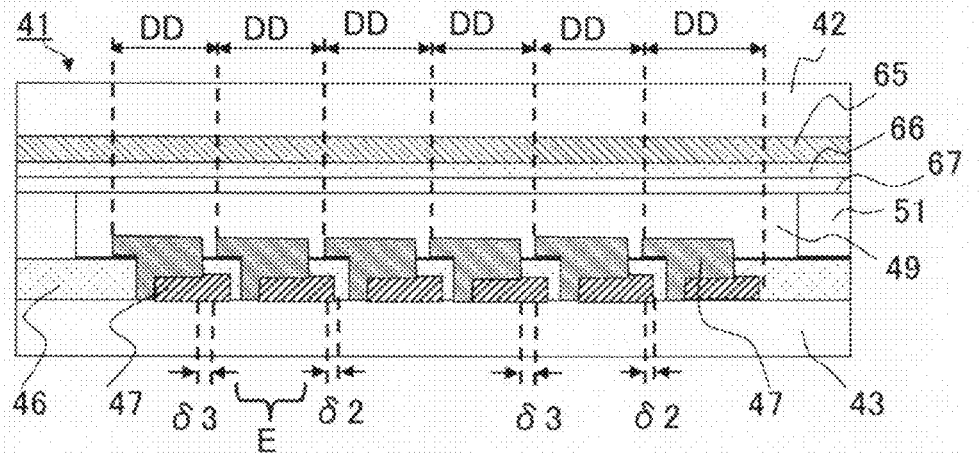
FIG. 9A is a cross-sectional view of a liquid crystal panel of Example 4 in an X direction.
Figure 9B:
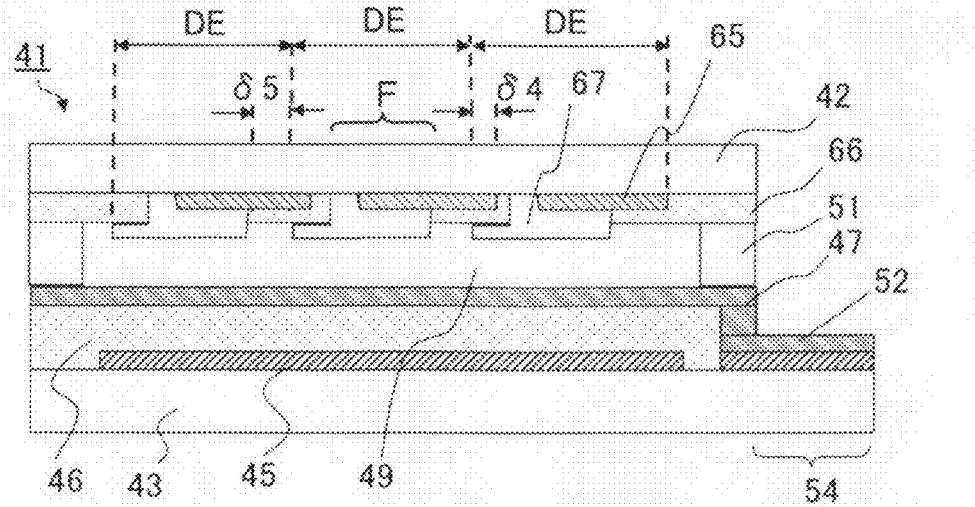
FIG. 9B is a cross-sectional view of the liquid crystal panel of Example 4 in a Y direction.

In this example, the gap electrodes are also formed on the upper substrate. Other structures are the same as Example 3, and hence detailed description thereof is omitted as appropriate. FIGS. 9A-9B schematically illustrate a liquid crystal panel 41 of this example. FIGS. 9A and 9B are schematic cross-sectional views of the liquid crystal panel 41 in an X-axis direction and a Y-axis direction, respectively. As illustrated in FIG. 9A, the electrodes formed in the display regions DD of the lower substrate 43 are the same as those of Example 3. As illustrated in FIGS. 9A and 9B, conductive films are laminated on the upper substrate 42 similarly to the lower substrate 43. On the surface of the upper substrate 42, a plurality of counter gap electrodes 65 are formed, an insulating film 66 is formed so as to cover the counter gap electrodes 65, and as many counter electrodes 67 as the counter gap electrodes 65 are formed thereon. The lower substrate 43 and the upper substrate 42 are adhered to each other by a sealing material 51, and a liquid crystal layer 49 is filled in a clearance between the substrates. In this case, the display electrodes 47 and the counter electrodes 67 correspond to plurality of line-shaped electrodes, and the display electrode 47 and the counter electrode 67 are formed so as to be orthogonal to each other.

The counter electrode 67 is formed of a fourth conductive film, and is formed so as to be electrically connected to the counter gap electrode 65 via a contact region F. Further, the counter electrode 67 is formed so as to overlap with the adjacent counter gap electrode 65 through intermediation of the insulating film 66 by δ4, and is formed apart from the adjacent counter electrode 67 by δ5. The overlapping width δ4 and the clearance δ5 between the counter electrodes in this case are only required to be set larger than the alignment accuracy of the counter electrode 67 with respect to the counter gap electrode 65. The overlapping width δ4 and the clearance δ5 between the counter electrodes may be arbitrarily set, but as the overlapping width between the counter electrode 67 and the counter gap electrode 65 is increased, the contact resistance decreases. In this manner, the voltage drop may be suppressed, and hence good display performance is obtained. Further, the length of the counter gap electrode 65 and the length of the contact region F may be arbitrarily set. However, when the contact area between the counter gap electrode 65 and the counter electrode 67 is increased, the voltage drop may be suppressed, and hence good display performance is obtained.

When an electric field is applied between the display electrode 47 and the counter electrode 67, the display electrode 47 and the gap electrode 45 are set to the same potential due to the contact region E. Similarly, the counter electrode 67 and the counter gap electrode 65 are set to the same potential due to the contact region F. Therefore, an electric field is applied to the liquid crystal layer 49 in all regions of the respective DD regions and the respective DE regions to enter the light transmitting state. Therefore, the clearance 55 between the counter electrode lines and the clearance 56 between the display electrode lines illustrated in FIG. 11 are also in the light transmitting state. Therefore, the aperture ratio increases. On the other hand, when the display electrode 47 and the counter electrode 67 are set to the same potential, all regions of the respective DD regions and the respective DE regions enter the light blocking state.

In the description above, a case of normally black mode display is exemplified, but in a case of a normally white mode display, it is needless to say that the light transmitting state and the light blocking state are reversed. Note that, the insulating films 46 and 66 use a photosensitive acrylic polymer resin similarly to Example 2. Subsequent contents are similar to those in Example 2, and hence description thereof is omitted.

With the electrode structure described above, no gap is formed between the display portion and the non-display portion, and hence the aperture ratio increases to increase the luminance. Thus, light leaking from the clearance between the display electrodes 47 and the clearance between the counter electrodes 67 reduces. Therefore, the contrast increases and good display performance is obtained.

What is claimed is:

1. A liquid crystal display device, comprising:
a substrate;
an insulating film formed on the substrate;
a first display electrode and a second display electrode formed on the insulating film;
a counter substrate;
a counter electrode formed on the counter substrate so as to be opposed to the first display electrode and the second display electrode;
a liquid crystal layer provided between the counter electrode and both the first display electrode and the second display electrode; and
a gap electrode provided between the substrate and the insulating film at a position corresponding to a clearance between the first display electrode and the second display electrode,
wherein the gap electrode is supplied with the same driving signal as a driving signal supplied to one of the first display electrode and the second display electrode, and
wherein the gap electrode and a display electrode of one of the first display electrode and the second display electrode are electrically connected to each other via a contact region provided in the insulating film.

2. A liquid crystal display device according to claim 1; wherein the first display electrode and the second display electrode are stripe-shaped electrodes which are adjacent to each other, and each of the first and second display electrodes forms a pixel at an intersection with the counter electrode, to thereby perform matrix display.

3. A liquid crystal display device, comprising:
a substrate;
an insulating film formed on the substrate;
a first display electrode and a second display electrode formed on the insulating film;
a counter substrate;
a counter electrode formed on the counter substrate so as to be opposed to the first display electrode and the second display electrode;
a liquid crystal layer provided between the counter electrode and both the first display electrode and the second display electrode;
a gap electrode provided between the substrate and the insulating film at a position corresponding to a clearance between the first display electrode and the second display electrode; and
a wiring electrode formed between the substrate and the insulating film and insulated from the gap electrode, wherein
the first display electrode and the gap electrode are electrically connected to each other;
the gap electrode is supplied with the same driving signal as a driving signal supplied to the first display electrode; and
the second display electrode is electrically connected to the wiring electrode.

4. A liquid crystal display device according to claim 3; wherein:
the gap electrode is electrically connected to the first display electrode via a contact region provided in the insulating film; and
the wiring electrode is electrically connected to the second display electrode via another contact region provided in the insulating film.

* * * * *